No. 755,712. PATENTED MAR. 29, 1904.
W. H. SEWELL.
TIRE FOR VEHICLE WHEELS.
APPLICATION FILED AUG. 29, 1903.
NO MODEL.
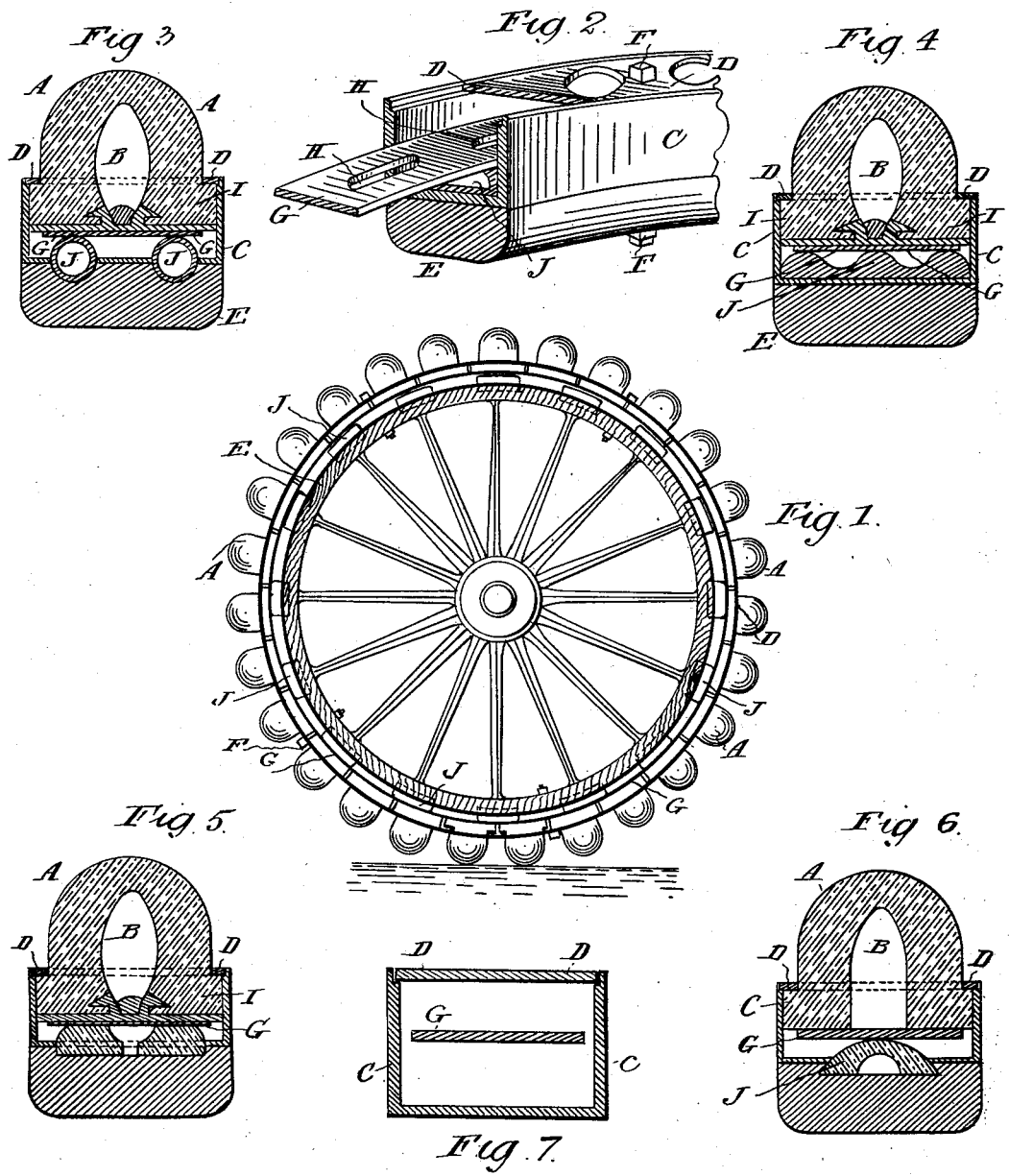
Witnesses
Inventor
William H. Sewell.
By Knight Bros
attys No. 755,712. Patented March 29, 1904.

UNITED STATES PATENT OFFICE.

WILLIAM HERBERT SEWELL, OF BELFAST, IRELAND.

TIRE FOR VEHICLE-WHEELS.

SPECIFICATION forming part of Letters Patent No. 755,712, dated March 29, 1904.

Application filed August 29, 1903. Serial No. 171,311. (No model.)

*To all whom it may concern:*

Be it known that I, WILLIAM HERBERT SEWELL, merchant, of 85 Victoria street, Belfast, Ireland, have invented certain new and useful Improvements in and Connected with Tires for Cycles, Motor-Cars, and other Vehicles, of which the following is a specification.

This invention relates to improvements in and connected with tires for cycles, motor-cars, and other vehicles and is a further development of that described in the specification under application Serial No. 149,291, filed on the 24th day of March, 1903; and it consists in a more certain and efficacious device for absorbing vibration, shock, and concussion.

In order that my invention may be properly understood and readily carried into effect, I have hereunto appended one sheet of drawings, of which—

Figure 1 is a front elevation of a wheel of a vehicle constructed in accordance with my invention. Fig. 2 is a sectional perspective view of a wheel, felly, and rim. Figs. 3, 4, 5, and 6 are transverse sections of fellies, rims, and tire, showing different forms of absorbing-buffer. Fig. 7 is a section of rim, showing base-plate or band.

In my application for patent at present pending, Serial No. 149,291, and in my therein-mentioned proposal to use buffers or cushions within channel or concavity of rim C it will be observed by reference to Figs. 2, 3, 5, and 6 of the drawings that a band G or so-called "base-plate" resting upon face of buffers or cushions J and of a sufficiently smaller circumferential and transverse area is made the medium for the attachment of the sections forming outer rim D to or on the wheel by the fact of this base-plate or band G and outer rim or face-plate D being bolted together and being thereby made one, F, Figs. 2 and 3. Thus what may be called the "tire" of the wheel—namely, base-plate or band G—and the sections of outer face-plate or rim D, which latter holds the rubber tread balls or segments, are made practically one piece and are loose within and project over or out of the channel or concavity of rim C. In the actual running of a wheel-tire thus, pressure, shock, or concussion of the ground-tread, will cause an upward thrust of what is designated above as the "tire," and the said shock received will be resisted and deadened according to the compressibility of the buffers or cushions in the lower half of the wheel-circumference.

The improvement I now propose is simple but important. I propose that the attachment of my outer rim or face-plate D shall be rigid and direct to the felly E of the wheel and that the base-plate or band G will intervene loosely between base I of my rubber tread balls or segments A and the face of the buffers J within channel of rim C, as shown more particularly in Figs. 3, 4, 5, and 6, the effect of this being that pressure, shock, or concussion on the running balls or segments A on ground-tread of wheel will cause an upward thrust of the band G not only against the compressible buffer or cushion J in lower half of wheel, but also against the compressible bases I of balls or segments A in the upper or opposite half of wheel's circumference, as shown on Fig. 1.

The face-plate or rim D, as will be seen in Fig. 2 of accompanying drawings, is attached to the felly by bolts F, which pass through elongated slots H in the base-plate or band G, but without in any way confining same.

I claim—

1. In a vehicle-tire, the combination of a felly, an inner channel-shaped rim rigidly secured to said felly, an outer rim fitting over the channel of said inner rim having openings, a plate lying loosely between said rims and dividing the channel circumferentially, segments or balls protruding through the openings of the outer rim and having elongated bases lying securely between said outer rim and said plate, and resilient means interposed between said plate and the bottom of the channel.

2. In a vehicle-tire, the combination of a felly, a channel-shaped inner rim rigidly secured to said felly, an outer rim fitting over the channel of said inner rim, having openings, a plate lying loosely between said rims, dividing the channel circumferentially and having elongated slots, means securing said outer rim to the felly, said means passing loosely through said slots, segments or balls protruding through the openings of the outer rim and having elongated bases lying securely between said outer rim and said plate, and resilient means interposed between said plate and the bottom of the channel.

3. In a vehicle-tire, the combination of a felly, a channel-shaped inner rim rigidly secured to said felly, an outer sectional rim fitting over the channel of said inner rim, the sections of said outer rim having openings, a plate lying loosely between said rims dividing the channel circumferentially and having elongated slots, means securing the sections of said outer rim to the felly, said means passing loosely through said slots, segments or balls protruding through the openings of the sections of the outer rim and having elongated bases lying securely between said sections and said plate, and resilient means interposed between said plate and the bottom of the channel.

In testimony whereof I have hereunto affixed my signature in presence of two witnesses.

WILLIAM HERBERT SEWELL.

Witnesses:
JOHN LIDDLE,
JOSEPH HENRY PEARSON.